United States Patent
Russian et al.

(10) Patent No.: US 12,397,366 B2
(45) Date of Patent: Aug. 26, 2025

(54) WELDING MACHINE

(71) Applicant: DANIELI & C. OFFICINE MECCANICHE S.p.A., Buttrio (IT)

(72) Inventors: Daniele Russian, Gemona del Fiuli (IT); Giuseppe Bordignon, Bicinicco (IT); Rolando Paolone, Buttrio (IT); Claudio Tomat, Premariacco (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 638 days.

(21) Appl. No.: 17/759,214

(22) PCT Filed: Feb. 2, 2021

(86) PCT No.: PCT/IB2021/050822
§ 371 (c)(1),
(2) Date: Jul. 21, 2022

(87) PCT Pub. No.: WO2021/156738
PCT Pub. Date: Aug. 12, 2021

(65) Prior Publication Data
US 2023/0052794 A1 Feb. 16, 2023

(30) Foreign Application Priority Data
Feb. 3, 2020 (IT) .................. 102020000002020

(51) Int. Cl.
*B23K 11/04* (2006.01)
*B21B 15/00* (2006.01)

(52) U.S. Cl.
CPC ........ *B23K 11/046* (2013.01); *B21B 15/0085* (2013.01)

(58) Field of Classification Search
None
See application file for complete search history.

(56) References Cited

U.S. PATENT DOCUMENTS

| | | |
|---|---|---|
| 2003/0196991 A1 | 10/2003 | Gobez et al. |
| 2011/0163074 A1* | 7/2011 | Kaga .................. B23K 26/244 219/83 |

(Continued)

FOREIGN PATENT DOCUMENTS

| | | |
|---|---|---|
| DE | 1003371 B | 2/1957 |
| EP | 0761328 A1 | 3/1997 |
| EP | 3578276 A1 | 12/2019 |

OTHER PUBLICATIONS

Patent Cooperation Treaty, International Search Report and Written Opinion for International Application No. PCT/IB2021/050822, May 28, 2021, 14 pages.

*Primary Examiner* — Thor S Campbell
(74) *Attorney, Agent, or Firm* — Stetina Garred Brucker & Newboles

(57) ABSTRACT

A welding machine, preferably of the flash butt welding type, designed to facilitate maintenance of the clamping means, e.g. clamps, of the two longitudinal metal products to be welded. Advantageously, a first structure, provided with first clamping means, and a second structure, provided with second clamping means, are supported in a first part of the carriage delimited by a first beam and a second beam of the carriage parallel to the feeding direction, while at least one transformer is fixed to the carriage and supported in a second part of the carriage, arranged laterally outside the first part.

19 Claims, 9 Drawing Sheets

(56) References Cited

U.S. PATENT DOCUMENTS

| | | | |
|---|---|---|---|
| 2017/0209953 A1* | 7/2017 | Steiner | E01B 11/50 |
| 2019/0054561 A1* | 2/2019 | Muehlleitner | B23K 37/0435 |
| 2019/0193184 A1* | 6/2019 | Trinco | B23D 79/02 |
| 2020/0199825 A1* | 6/2020 | Muehlleitner | E01B 29/44 |
| 2020/0282487 A1* | 9/2020 | Muehlleitner | E01B 31/12 |
| 2021/0121972 A1* | 4/2021 | Trinco | B23K 11/04 |
| 2022/0316146 A1* | 10/2022 | Bauer | E01B 11/46 |
| 2025/0073806 A1* | 3/2025 | Kullmann | B23K 11/0073 |
| 2025/0162059 A1* | 5/2025 | Saro | B23K 37/0435 |

* cited by examiner

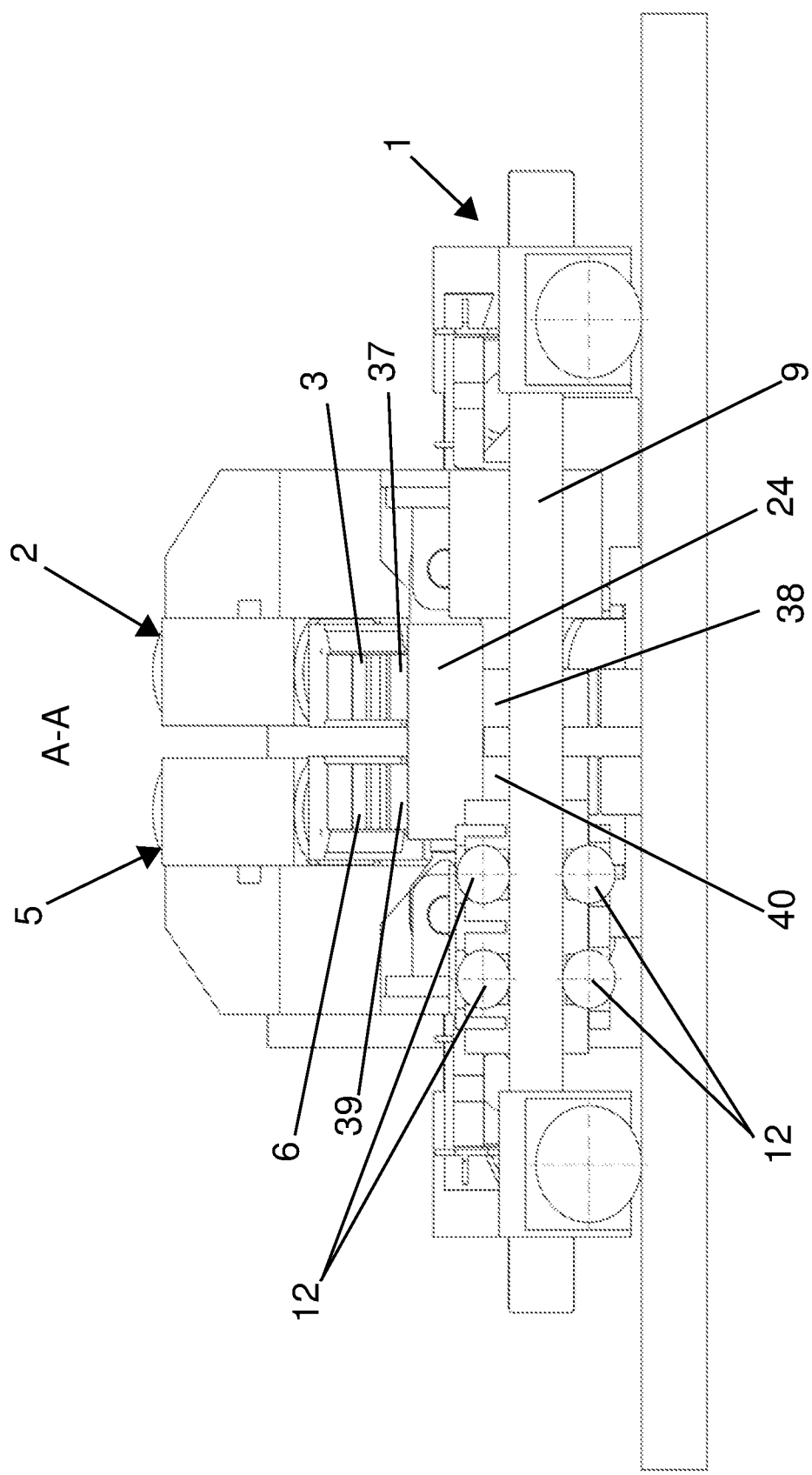

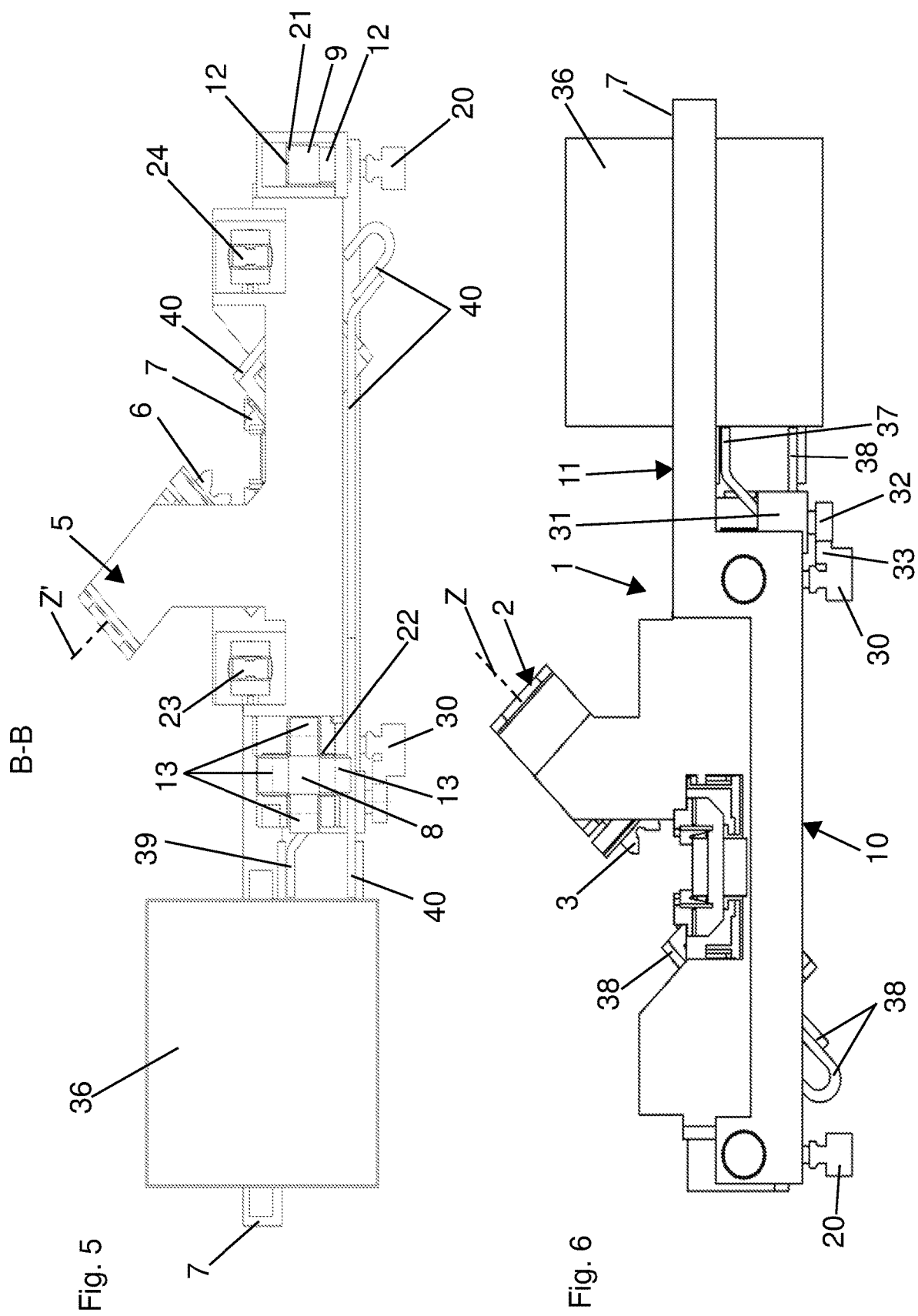

WELDING MACHINE

CROSS-REFERENCE TO RELATED APPLICATIONS

This application claims priority to PCT International Application No. PCT/IB2021/050822 filed on Feb. 2, 2021, which application claims priority to Italian Patent Application No. 102020000002020 filed on Feb. 3, 2020, the entire disclosures of which are expressly incorporated herein by reference.

STATEMENT RE: FEDERALLY SPONSORED RESEARCH/DEVELOPMENT

Not Applicable

BACKGROUND

Field of the Invention

The present invention relates to a welding machine, preferably of the flash welding type, for longitudinal metal products, e.g. billets, bars or blooms, adapted to weld the head and tail of two consecutive longitudinal products to each other along a roller pathway, usually arranged upstream of a rolling mill.

Background Art

In rolling mills, in particular of the endless type, the metal products from the casting machine or from external warehouses are welded together and then seamlessly rolled.

The metal products, which are welded, are typically semi-finished casting products, e.g. such as, billets, bars or blooms.

The welding is carried out by joining the tail of one product to the head of the successive product.

The welding is achieved by means of electric arcs produced by power supplies connected to the products to be welded. This technology is known as flash welding.

During welding, the products must be effectively blocked. To this end, clamping means are provided, which serve to keep the products in place while welding and that often act also as conductors of the welding electric current.

Such clamping means typically comprise elements, in particular clamps, which come directly into contact with the products to be welded. Gradually as the welding is carried out, the clamps, which hold the head and tail of the products to be welded, are brought close by means of hydraulic cylinders, named upsetting cylinders. This operation is necessary to join the ends to be welded, to eliminate any inclusions and air bubbles and to compensate for the loss of material, in the form of burrs, determined by the melting, and to allow the effective adhesion between the two components being welded, which form a joint, named weld joint.

A known type of flash butt welding machine generally comprises two structures, each provided with a pair of clamps, the structures being substantially parallel to each other and inclined at an angle of about 45° relative to the plane defined by the carriage supporting the machine. Said inclination allows a uniform application of the contact force of the clamps with the product on the sides thereof, thus allowing its optimal retention and centering.

Disadvantageously, the transformer, provided with conductors connected to the two structures to supply electric current to the tail and head of the two products to be welded, is located above the inclined upper surfaces of the two structures, which makes access and, consequently, maintenance of the internal parts of the machine difficult. Even the disassembly and removal of heavy parts from the machine become difficult operations which must be carried out manually by the operators, who must enter inside the machine in difficult conditions.

Therefore, there is a need to solve at least the aforesaid drawback by making a welding machine, which can offer easy maintenance and the possibility to operate with aids, such as cranes and bridge cranes, for the clearing heavy bodies.

SUMMARY OF THE INVENTION

It is an object of the present invention to produce a welding machine, preferably of the flash butt welding type, which allows easy access to the internal parts of the clamp-holding structures, allowing rapid maintenance and cleaning, and allowing the possibility to operate with common aids, such as cranes and overhead cranes, for clearing heavy components.

It is another object of the present invention to produce a welding machine, which is simple from a structural point of view, and which nonetheless allows the movements required by the known welding machines to be carried out.

It is a further object of the present invention to produce a welding machine which makes it possible to increase safety for operators.

The present invention achieves at least one of such objects and other objects which will be apparent in light of the present description, by means of a welding machine, preferably of the flash butt welding type, to weld the tail of a first longitudinal metal product together with the head of a second longitudinal metal product along a feeding direction X of said longitudinal metal products, the machine comprising a carriage adapted to slide along the feeding direction X, said carriage supporting a first structure connected to said carriage;
first clamping means, provided on said first structure, to clamp either the tail of the first metal product or the head of the second metal product;
a second structure sliding parallel to the feeding direction, with respect to both the first structure and the carriage;
second clamping means, provided on said second structure, to clamp either the head of the second metal product or the tail of the first metal product;
at least one transformer provided with conductors connected to the first clamping means and to the second clamping means, respectively, to supply electric current to said tail and said head;

wherein the first structure and the second structure are supported in a first part of the carriage delimited by a first beam and a second beam of the carriage which are parallel to the feeding direction X, while the at least one transformer is fixed to the carriage and supported thereby in a second part thereof, arranged laterally outside the first part.

Advantageously, the transformer is integrally fixed to the carriage and, not being positioned above the two structures, access from above and, consequently, maintenance of the internal parts of the machine are facilitated. Disassembly and removal of heavy parts and components from the machine also become extremely simple operations, which can be carried out with common aids, such as cranes and overhead cranes. Advantageously, the machine components subject to maintenance are accessible and can be lifted from above.

Preferably, the conductors which connect the transformer to the first clamping means and the second clamping means, respectively, pass underneath the first structure and the second structure, respectively, so that both the space between the first clamping means and the space between the second clamping means are freely accessible from below in the absence of longitudinal metal products to be welded.

A further advantage is represented by the variant in which the second structure can slide, parallel to the feeding direction and relative to both the first structure and the carriage, on two beams, which are part of the carriage itself and which delimit said first part of the carriage, or can slide on two further beams, distinct from the beams of the carriage, which are part of a lifting system adapted to lift together both the first structure and the second structure with respect to the carriage by means of a rotation of a predetermined angle along a plane which is transverse to said feeding direction.

Furthermore, the configuration of the welding machine according to the invention allows to make a drainage floor underneath it, which can be at a distance of less than 1.5 meters from the product passline, preferably less than 1 meter. This means lower costs for the realization of the foundations of the production line.

Further features and advantages of the invention will become more apparent in light of the detailed description of preferred, but not exclusive, embodiments.

The dependent claims describe particular embodiments of the invention.

BRIEF DESCRIPTION OF THE FIGURES

The description of the invention refers to the accompanying drawings, which are provided by way of non-limiting example, in which:

FIG. 4 is a cross-section view taken along a plane A-A of the machine in FIG. 2;

FIG. 5 is a cross-section view taken along a plane B-B of the machine in FIG. 2;

FIG. 6 is a first side view of the machine in FIG. 1;

The same reference numbers and letters in the figures refer to the same elements or components.

DESCRIPTION OF EXAMPLE EMBODIMENTS OF THE INVENTION

Figure 1:
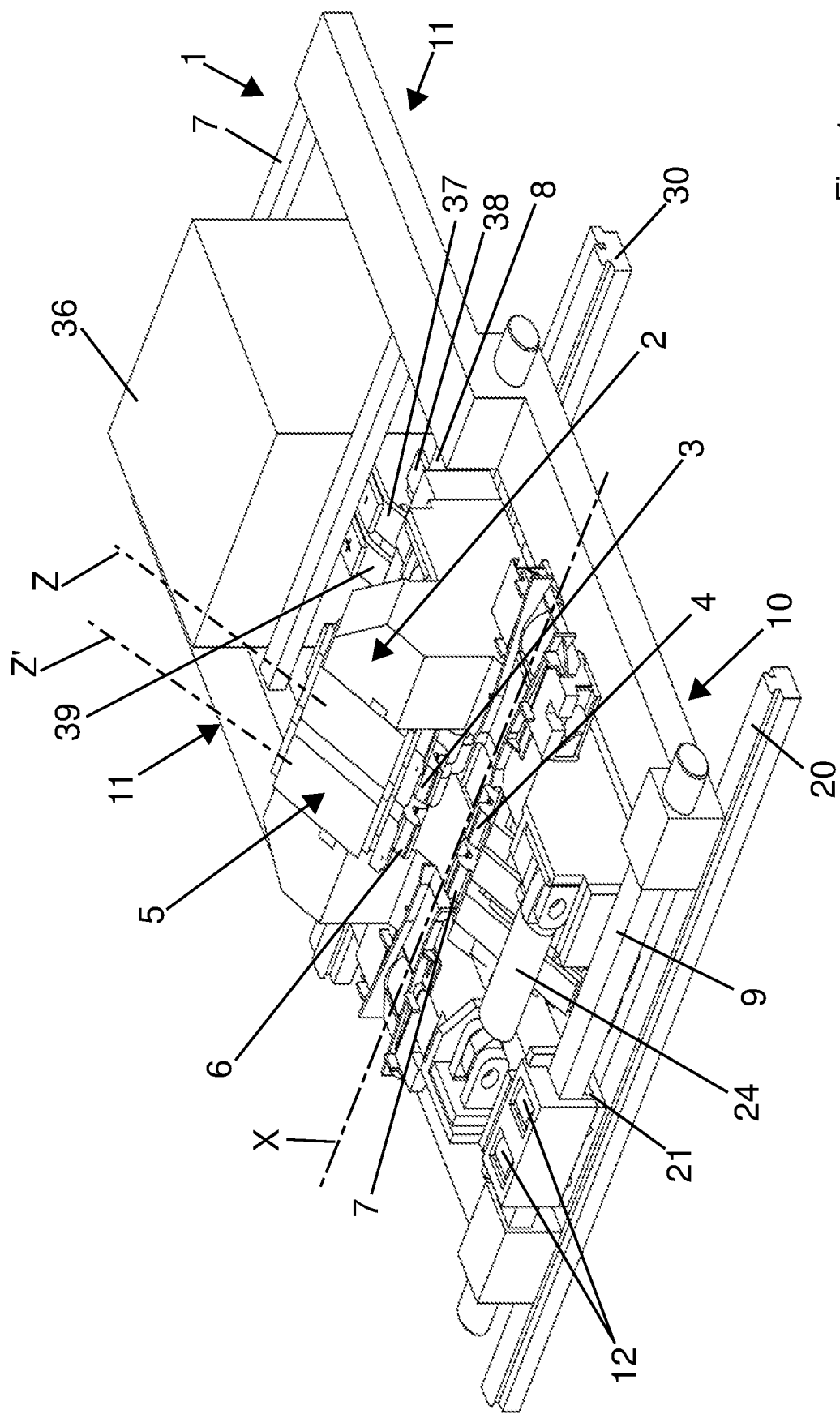
FIG. 1 is a perspective view of a first embodiment of the welding machine according to the invention.

Some examples of a welding machine of the flash butt welding type according to the invention are illustrated with reference to the Figures.

In all the embodiments of the invention, the welding machine, which is suitable for welding the tail of a first longitudinal metal product to the head of a second longitudinal metal product along a feeding direction X of said longitudinal metal products, comprises a carriage 1, adapted to slide on at least two sliding guides 20, 30 along said feeding direction X above a roller path (not shown) on which the longitudinal metal products, such as billets, blooms or bars, advance.

The carriage 1 supports:
a first structure 2 connected to the carriage 1;
first clamping means 3, 4, provided on the first structure 2, for clamping the tail of the first metal product or the head of the second metal product;
a second structure 5 sliding, relative to both the first structure 2 and the carriage 1, parallel to the feeding direction X;
second clamping means 6, 7, provided on the second structure 5, for clamping the head of the second metal product or the tail of the first metal product;
at least one transformer 36 provided with conductors 37, 38, 39, 40 connected to the first clamping means 3, 4 and to the second clamping means 6, 7, respectively, to supply electric current to said tail and said head.

In a first embodiment, shown in FIGS. 1-6, the first structure 2 defines a longitudinal axis Z (FIG. 1), inclined relative to a horizontal plane, by an acute angle, preferably between 30° and 70°, e.g. 45°. The second structure 5, defining an own longitudinal axis Z' parallel to the longitudinal axis Z (FIG. 1), is arranged substantially parallel to the first structure 2 and spaced from the latter along the feeding direction X of the products to be welded.

In a variant (not shown), instead, the first structure 2 and the second structure 5, substantially parallel to each other, define a respective longitudinal axis arranged substantially horizontally.

At least one infeed guide and at least one outfeed guide are optionally provided for the infeed and outfeed of metal products from the welding machine, each guide being constrained to a respective structure 2, 5 along the feeding axis X. Alternatively, said guides can be part of the carriage 1.

Figure 2:
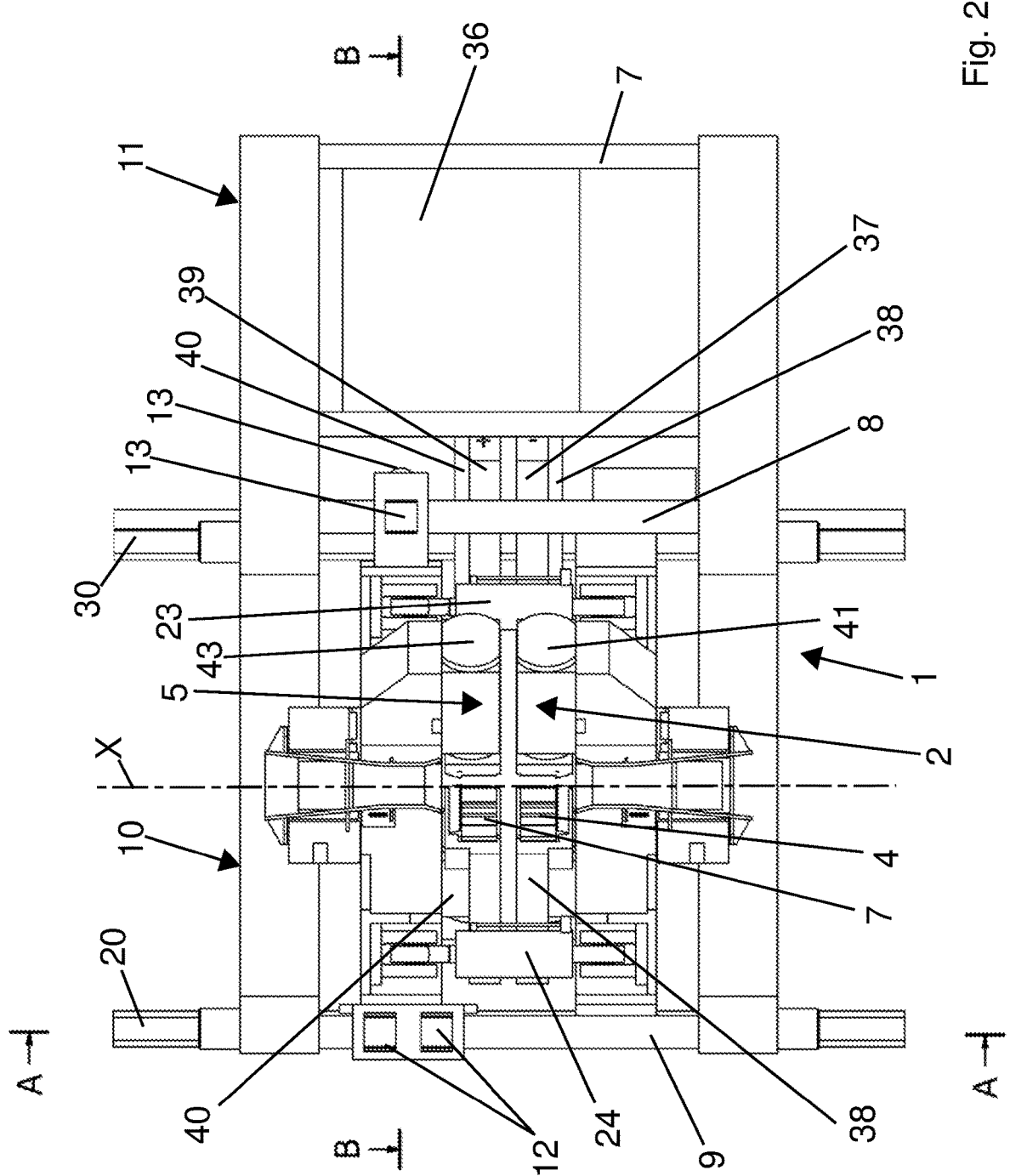
FIG. 2 is a top view of the machine in FIG. 1.
Figure 3:
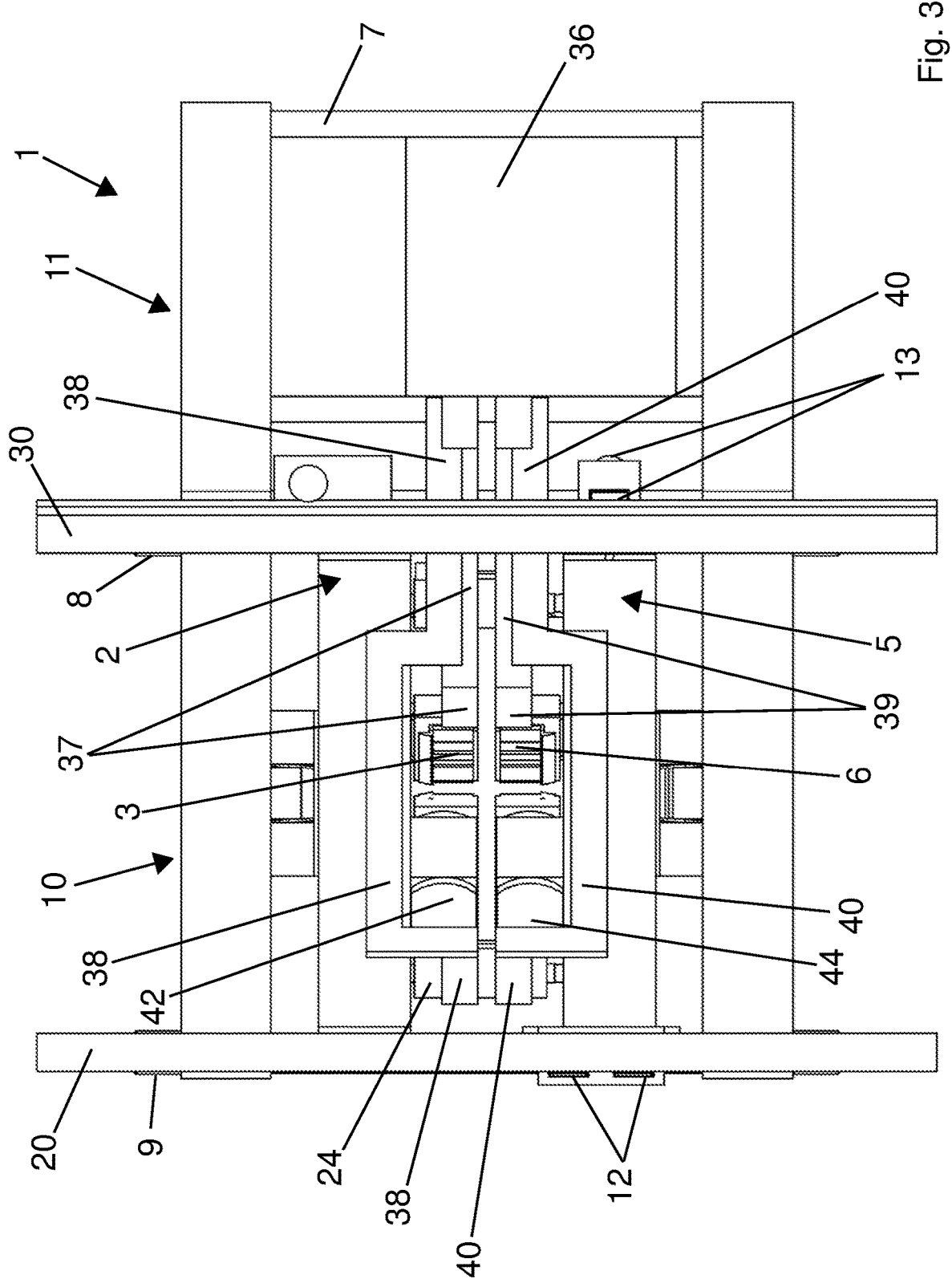
FIG. 3 is a bottom view of the machine in FIG. 1.

Preferably, both the first clamping means 3, 4 and the second clamping means 6, 7 are possibly adjustable in position by means of respective moving systems 41, 42; 43, 44 provided on the first structure 2 and on the second structure 5, respectively (FIGS. 2 and 3). Such moving systems comprise, for example, hydraulic cylinders or jacks, or electric actuators or mechanical moving devices, such as cam or eccentric devices.

In particular, the first clamping means 3, 4 of the first structure 2 comprise a respective upper clamp 3 and a respective lower clamp 4. Each clamp 3, 4 can be moved along the Z-axis by a respective moving system 41, 42 (FIGS. 2 and 3).

The second clamping means 6, 7 of the second structure 5 comprise a respective upper clamp 6 and a respective lower clamp 7. Once again, each clamp 6, 7 can be possibly moved along the Z'-axis by a respective moving system 43, 44 (FIGS. 2 and 3).

The movement, and therefore the adjustability, of all the clamps of the clamping means advantageously eliminates the need to have to incline or rotate slightly the two structures 2, 5 to prevent the metal product, e.g. the billet, from slipping on the lower clamps, which are fixed in the machines of the prior art.

Advantageously, the first structure 2 and the second structure 5 are supported, and possibly also contained, in a first part 10 of the carriage 1 delimited by a first beam 9 and a second beam 8 of the carriage that are parallel to each other and to the feeding direction X, while the at least one transformer 36 is fixed to the carriage 1 and supported, and possibly also contained, entirely in a second part 11 of the carriage 1, arranged laterally outside the first part 10. The transformer 36 can be a single transformer. Alternatively, a group of transformers can be provided which concur to electrically supply the clamps 3, 4, 6, 7 by means of the conductors 37, 38, 39, 40.

In a variant (not shown) of this first embodiment, there are, instead, provided two or more transformers fixed to the carriage 1 and supported, and possibly also contained, entirely in said second part 11.

In this first embodiment of the invention, the second part 11 of the carriage 1 can be delimited by said second beam 8 and a third beam 7 of the carriage 1, preferably parallel to the second beam 8. The first beam 9 and the third beam 7 are peripheral beams of the carriage 1 while the second beam 8 is an intermediate beam. At least two further peripheral beams, which are transverse, preferably perpendicular, to the beams 9, 8, 7 are provided to define the perimeter of the carriage 1 together with the beams 9 and 7.

Figure 2A:
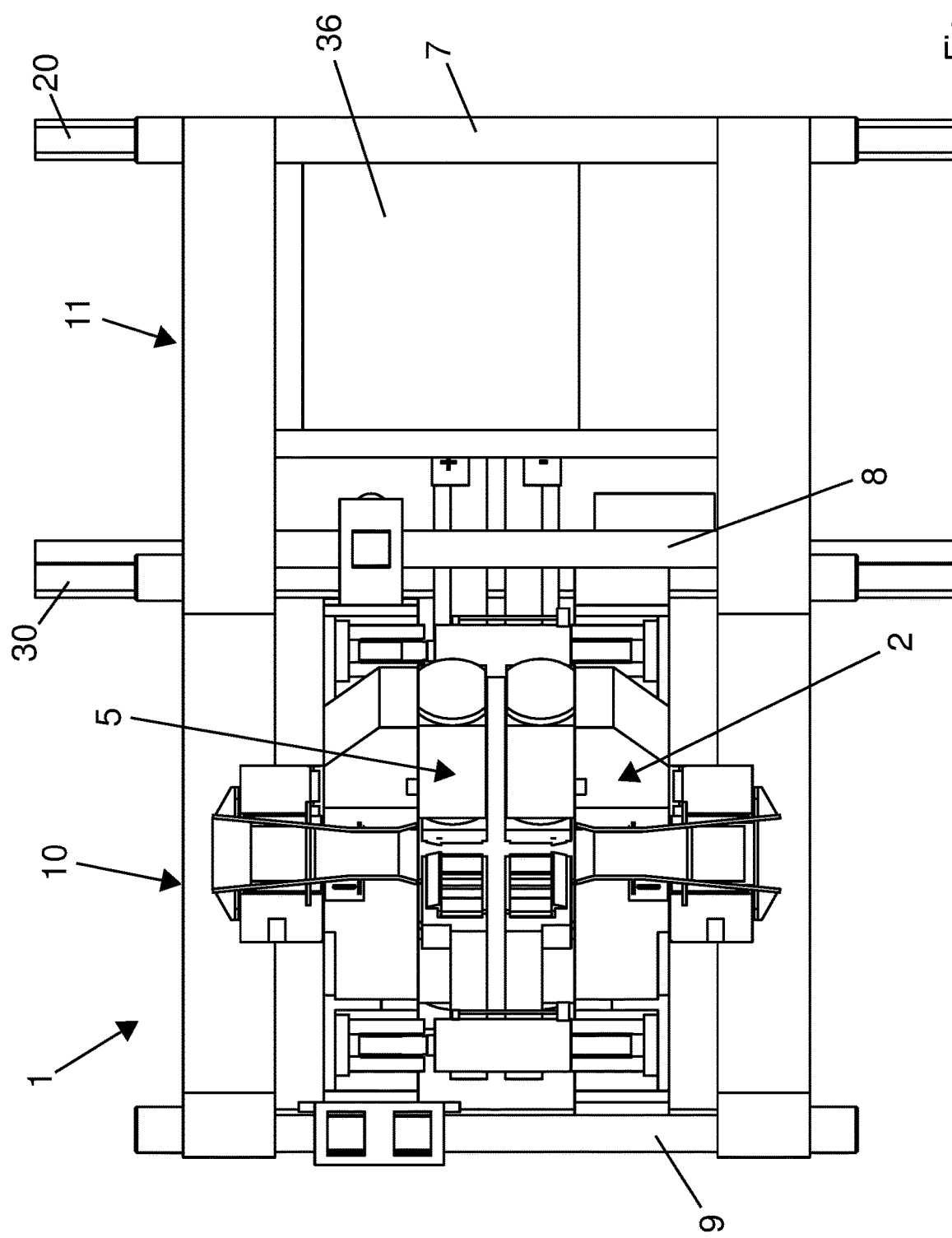
FIG. 2a is a top view of a variant of the machine in FIG. 1.

The carriage 1 is preferably arranged on two sliding guides 20, 30 fixed, either directly or by means of frames, on a floor below the welding machine, said sliding guides being parallel to each other and to the axis X. In the variant of FIG. 2, the first beam 9 and the second beam 8 of the carriage 1 are positioned at a respective sliding guide 20, 30. In this case, the first part 10 of the carriage 1 is above and at an area delimited by the sliding guides 20, 30. Instead, in the variant of FIG. 2a, the second beam 8 is positioned at the sliding guide 30, while the third beam 7 is positioned at the sliding guide 20. In this case, the second part 11 of the carriage 1 is above and at the area delimited by the sliding guides 20, 30.

Alternatively, the beams 9, 8 or the beams 8, 7 could also be offset relative to the sliding guides 20, 30.

Optionally, the conductors 37, 38 and 39, 40 connect the transformer 36 to the first clamping means 3, 4 and to the second clamping means 6, 7, respectively, passing underneath the first structure 2 and the second structure 5, respectively, in order to leave both the space between the first clamping means 3, 4 and the space between the second clamping means 6, 7 freely accessible from below in the absence of longitudinal metal products to be welded.

Preferably, as better illustrated in FIGS. 2, 3 and 5, 6, the upper conductors 37, 39 exiting the transformer 36 can advance parallel to each other by passing for a small stretch respectively below the first structure 2 and the second structure 5 until arriving in proximity of the respective upper clamps 3 and 6. Preferably, the pattern of the current is such that the circuit closes between the upper clamps 3 and 6 of the two structures.

The lower conductors 38, 40, as better illustrated in FIGS. 3, 5 and 6, exiting from the transformer 36 can advance parallel to each other with a first stretch thereof below the first structure 2 and the second structure 5, respectively. Before arriving at the upper clamps 3, 6 the lower conductors 38, 40 can deviate by moving away from each other with a second stretch thereof and then advance parallel to each other again with a third stretch thereof, and approach each other again in proximity of the foot of the first structure 2 and of the second structure 5 with a fourth stretch thereof. A fifth and final stretch of the conductors 38, 40 finally arrives in proximity of the respective lower clamps 4 and 7. Preferably, the pattern of the current is such that the circuit closes between the lower clamps 4 and 7 of the two structures. The configuration of the stretches of the lower conductors 38, 40 is thus designed to leave completely accessible from below at least the area comprising the clamping means 3, 4 and 6, 7.

Advantageously, since the transformer 36 is not arranged above the structures 2 and 5, both the space between the first clamping means 3, 4 and the space between the second clamping means 6, 7 are freely accessible both from above and below in the absence of longitudinal metal products to be welded.

In the variant (not shown) comprising two or more transformers in the second part 11 of the carriage 1, e.g. only two transformers arranged on top of each other, a first upper conductor and a first lower conductor exit the respective transformer and respectively reach the clamps 3, 4 of the first structure 2; while a second upper conductor and a second lower conductor exit the respective transformer and respectively reach the clamps 6, 7 of the second structure 5. Also in this case, the pattern of the currents is such that the two circuits close between the upper clamps 3 and 6 and between the lower clamps 4 and 7, respectively.

In all variants, however, the conductors can be arranged in configurations other than those described above, while maintaining free access from below to both the space between the first clamping means 3, 4 and the space between the second clamping means 6, 7, in the absence of the longitudinal metal products to be welded.

Preferably, the first structure 2 and the second structure 5, in addition to being arranged substantially parallel to each other, are arranged transversely, preferably orthogonally, to the first beam 9 and the second beam 8.

In particular, in a first variant shown in FIGS. 1-7, the first beam 9 and the second beam 8 have a respective first portion, proximal to the first structure 2 and to which said first structure 2 is integrally fixed, and a respective second portion, distal from the first structure 2 and to which the second structure 5 is slidingly connected.

In a variant of the invention, the second portion of the first beam 9 is inserted in a first through-hole 21 of the second structure 5 (FIGS. 1 and 5) internally provided with first rolls or pads 12 for a sliding of the second structure 5 on the first beam 9; and the second portion of the second beam 8 is inserted in a second through-hole 22 of the second structure 5 (FIG. 5) provided internally with second rolls or pads 13 for a sliding of the second structure 5 on the second beam 8.

Preferably, both the second portion of the first beam 9 and the first through-hole 21 have a quadrangular cross-section, and said first through-hole 21 is provided with first rolls or pads 12 only on two mutually opposite inner sides (FIG. 5), preferably above and below the first beam 9. Optionally, a pair of first rolls 12 is provided on each of said two inner sides (FIG. 4). Also the second portion of the second beam 8 and the second through-hole 22 can have a quadrangular section, and said second through-hole 22 is provided with at least one second roll or pad 13 on at least three of its inner sides. In particular, in the variant of FIG. 5, four rolls or pads 13 are provided, one on each of the inner sides of the through-hole 22. Instead, in a variant (not shown) only three rolls or pads 13 are provided, one upper roll at the upper inner side of the through-hole 22, thus above the beam 8, and the other two rolls at the sides of the beam 8. Therefore, there is no lower roll or pad which, if present, results in better alignment.

In a particular variant, the first rolls 12 are idle, accommodated in respective seats obtained in the second structure 5 and protruding into the first through-hole 21 to come into contact with mutually opposite surfaces of the first beam 9; and also the second rolls 13 are idle, accommodated in respective seats obtained in the second structure 5 and protruding into the second through-hole 22 to come into contact with the respective side surface of the second beam 8.

Alternatively to the quadrangular sections of beams 9, 8 and respective through-holes 21, 22, both the second portion of the first beam 9 and the first through-hole 21 have a round section, and said first through-hole 21 is provided with first pads 12; and both the second portion of the second beam 8 and the second through-hole 22 have a round section and said second through-hole 22 is provided with second pads 13.

Furthermore, the sliding of the second structure 5 on the beams 9 and 8 can alternatively be achieved by reversing the configuration of the rolls or pads between the two through-holes 21, 22. Therefore, the first through-hole 21 of the second structure 5 can be internally provided with at least three rolls or pads 13 for a sliding of the second structure 5 on the first beam 9; and the second through-hole 22 of the second structure 5 can be internally provided with second rolls or pads 12, only on two internal sides opposite to each other, for a sliding of the second structure 5 on the second beam 8.

Figure 8:
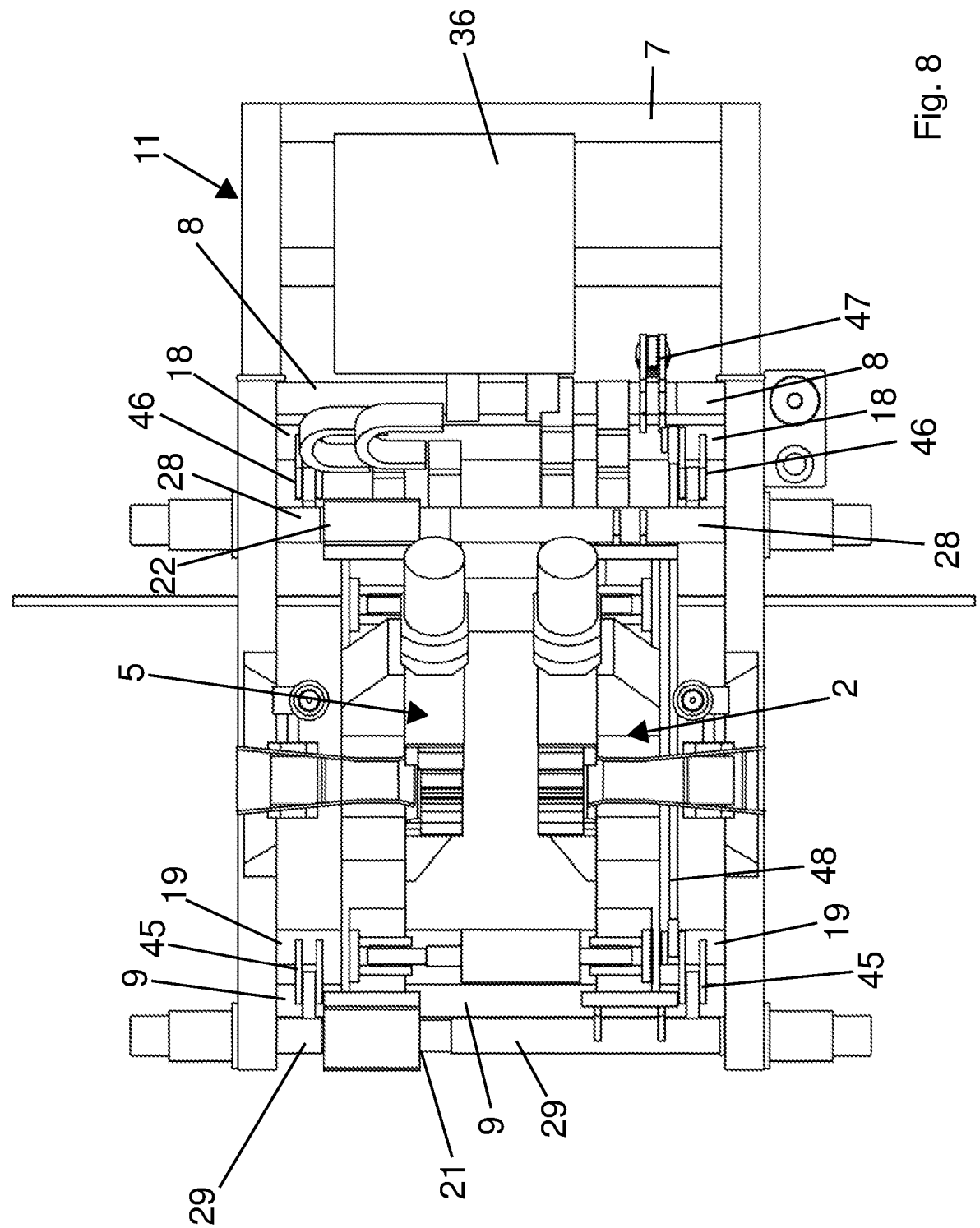
FIG. 8 is a top view of a further variant of the welding machine according to the invention.
Figure 9:
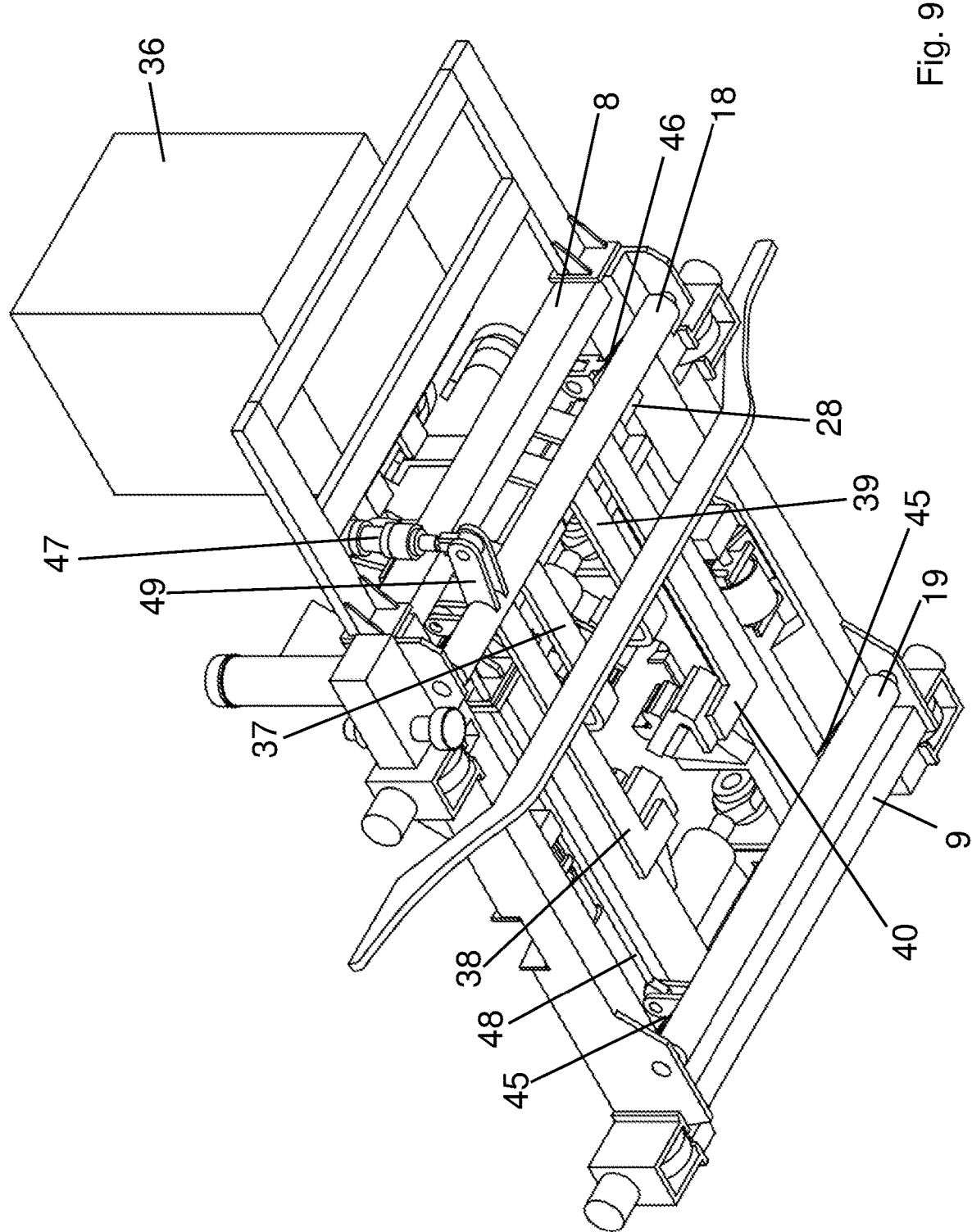
FIG. 9 is a perspective bottom view of said further variant in FIG. 8.

Should it be necessary or desired to move the two structures 2, 5 slightly to prevent the metal product, e.g. the billet, from slipping on the lower clamps, a second variant, shown in FIGS. 8 and 9, provides that the first structure 2 and the second structure 5 are supported in the first part 10 of the carriage 1 not by means of the beams 8 and 9 of the carriage itself, but instead by means of a lifting system adapted to lifting said first structure 2 and said second structure 5 together with respect to the carriage 1, by means of a rotation along a plane which is transverse to the feeding direction X. Such a rotation can be in the range of 1° to 25°, e.g. 1° to 15°. Thus, this lifting system makes it possible to move the structures 2 and 5 with respect to the product to be welded.

Said lifting system, preferably of the linkage type, comprises:
 a first rotating shaft 19, parallel and proximal to the first beam 9 of the carriage, and constrained to the carriage so as to rotate about an axis thereof, e.g. pivoted at its ends to the carriage peripheral beams which are transverse to the feeding direction X;
 a second rotating shaft 18, parallel and proximal to the second beam 8 of the carriage, and constrained to the carriage so as to rotate about an axis thereof, e.g. pivoted at its ends to said transverse peripheral beams;
 a further first beam 29, distinct from the carriage, parallel, proximal and possibly placed above said first rotating shaft 19 and said first beam 9;
 a further second beam 28, distinct from the carriage, parallel, proximal and possibly placed above said second rotating shaft 18 and said second beam 8;
 at least one first lever 45 connecting, either directly or indirectly, the first rotating shaft 19 to said further first beam 29;
 at least one second lever 46 connecting, either directly or indirectly, the second rotating shaft 18 to said further second beam 28;
 preferably at least one connecting rod or tie rod 48 connecting first rotating shaft 19 and second rotating shaft 18.

In a variant, the longitudinal axes of the first rotating shaft 19 and the second rotating shaft 18 are parallel and arranged on a first horizontal plane. The longitudinal axes of the further first beam 29 and the further second beam 28 are also parallel and arranged on a second horizontal plane, located above the first horizontal plane. The relative position between each rotating shaft 18, 19 and the corresponding further beam 28, 29 is such that the levers 45, 46 are always inclined at an acute angle other than zero with respect to the vertical.

Preferably, the following are provided (FIG. 8):
 two first levers 45, each fixed to at a first end thereof to a respective end of the first rotating shaft 19, and connected, directly or indirectly, at a second end thereof to a respective end of the further first beam 29;
 two second levers 46, each fixed at a first end thereof to a respective end of the second rotating shaft 18, and connected, directly or indirectly, at a second end thereof to a respective end of the further second beam 28.

The further first beam 29 and the further second beam 28 support both the first structure 2 and the second structure 5, which are arranged substantially parallel to each other and transversely, preferably orthogonally, to said further first beam 29 and said further second beam 28.

At least one actuator 47 is provided, adapted to rotate the first rotating shaft 19 and/or the second rotating shaft 18 by a predetermined angle so that the first structure 2 and the second structure 5 can be lifted together with respect to the carriage 1.

Preferably, in the variant of FIGS. 8-9, only one actuator 47 is provided, e.g. fixed on the beam 9 of the carriage 1, which acts on a further lever 49 of the second rotating shaft 18.

Starting from the resting position (FIG. 9), the actuator 47 pushes the lever 49 downwards causing the rotating shaft 18 to rotate by a predetermined angle, about own axis, and to transmit, by means of levers 46, the upward rotation to the further beam 28. Since the further beam 28 and the further beam 29 together transversely support both the structure 2 and the structure 5, the upward rotation is also transmitted to the further beam 29 and, therefore, the rotating shaft 19 also accordingly rotates about its axis. Preferably, a connecting rod or tie rod 48 can synchronize the rotations of the two rotating shafts 18, 19, facilitating the lifting, by rotation, of the further beams 28, 29.

In particular, the further first beam 29 and said further second beam 28 have a respective first portion, which is proximal to the first structure 2 and to which said first structure 2 is integrally fixed, and a respective second portion, which is distal from the first structure 2 and to which the second structure 5 is slidingly connected.

In a variant of the invention, the second portion of the further first beam 29 is inserted into a first through-hole 21 of the second structure 5, internally provided with first rolls or pads for a sliding of the second structure 5 on said further first beam 29; and the second portion of the further second beam 28 is inserted into a second through-hole 22 of the second structure 5, internally provided with second rolls or pads for a sliding of the second structure 5 on said further second beam 28.

Preferably, both the second portion of the further first beam 29 and the first through-hole 21 have a quadrangular cross-section, and said first through-hole 21 is provided with first rolls or pads only on two inner sides opposite to each other (in a manner similar to FIG. 5), preferably above and below the beam 29. Optionally, a pair of first rolls is provided on each of said two inner sides (in a manner similar to FIG. 4). Also the second portion of the further second beam 28 and the second through-hole 22 can have a quadrangular section and said second through-hole 22 is provided with at least one second roll or pad on at least three of its inner sides. In particular, in a variant (in a manner similar to FIG. 5), four second rolls or pads are provided, one on each of the inner sides of the through-hole 22. In a further variant, instead, only three second rolls or pads are provided, one upper roll at the upper inner side of the through-hole 22, therefore above the beam 28, and the other two rolls at the sides of the beam 28. Therefore, there is no lower roll or pad which, if present, results in better alignment.

In a particular variant, the first rolls are idle, accommodated in respective seats obtained in the second structure 5 and protruding into the first through-hole 21 to come into contact with mutually opposite surfaces of the further first beam 29; and also the second rolls are idle, accommodated in respective seats in the second structure 5 and protruding into the second through-hole 22 to come into contact with the respective side surface of the further second beam 28.

Alternatively to the quadrangular sections of the further beams 29, 28 and of the respective through-holes 21, 22, both the second portion of the further first beam 29 and the first through-hole 21 have a round section, and said first through-hole 21 is provided with first pads; and both the second portion of the further second beam 28 and the second through-hole 22 have a round section and said second through-hole 22 is provided with second pads.

Furthermore, the sliding of the second structure 5 on the further beams 29 and 28 can alternatively be achieved by reversing the configuration of the rolls or pads between the two through-holes 21, 22. Therefore, the first through-hole 21 of the second structure 5 can be internally provided with at least three second rolls or pads for a sliding of the second structure 5 on the further first beam 9; and the second through-hole 22 of the second structure 5 can be internally provided with first rolls or pads, only on two internal sides opposite to each other, for a sliding of the second structure 5 on the further second beam 28.

A further advantage of the invention can be that of making the carriage 1 provided with at least one motor 31 connected to a toothed wheel 32 adapted to engage a rack 33 provided on at least one of the sliding guides 20, 30 (FIG. 6), preferably on one of the sides of the sliding guide.

In the welding machine of the invention, adjustment means 23, 24 can be provided for moving the second structure 5 towards or away from the first structure 2 along said feeding direction X. The approaching is made, in particular, when welding two products by flash welding.

Optionally, said adjustment means are upsetting cylinders 23, 24, which preferably are two in number.

The upsetting cylinders 23, 24 are pivoted at a first end thereof to the first structure 2 and at a second end thereof to the second structure 5 by means of respective pins.

In the variant shown in FIG. 5, a first upsetting cylinder 23 is arranged inferiorly behind both the first structure 2 and the second structure 5. In contrast, the second upsetting cylinder 24 is arranged substantially at the feet of both the first structure 2 and the second structure 5. Preferably the two upsetting cylinders 23, 24 are arranged along a same substantially horizontal plane.

Figure 7:
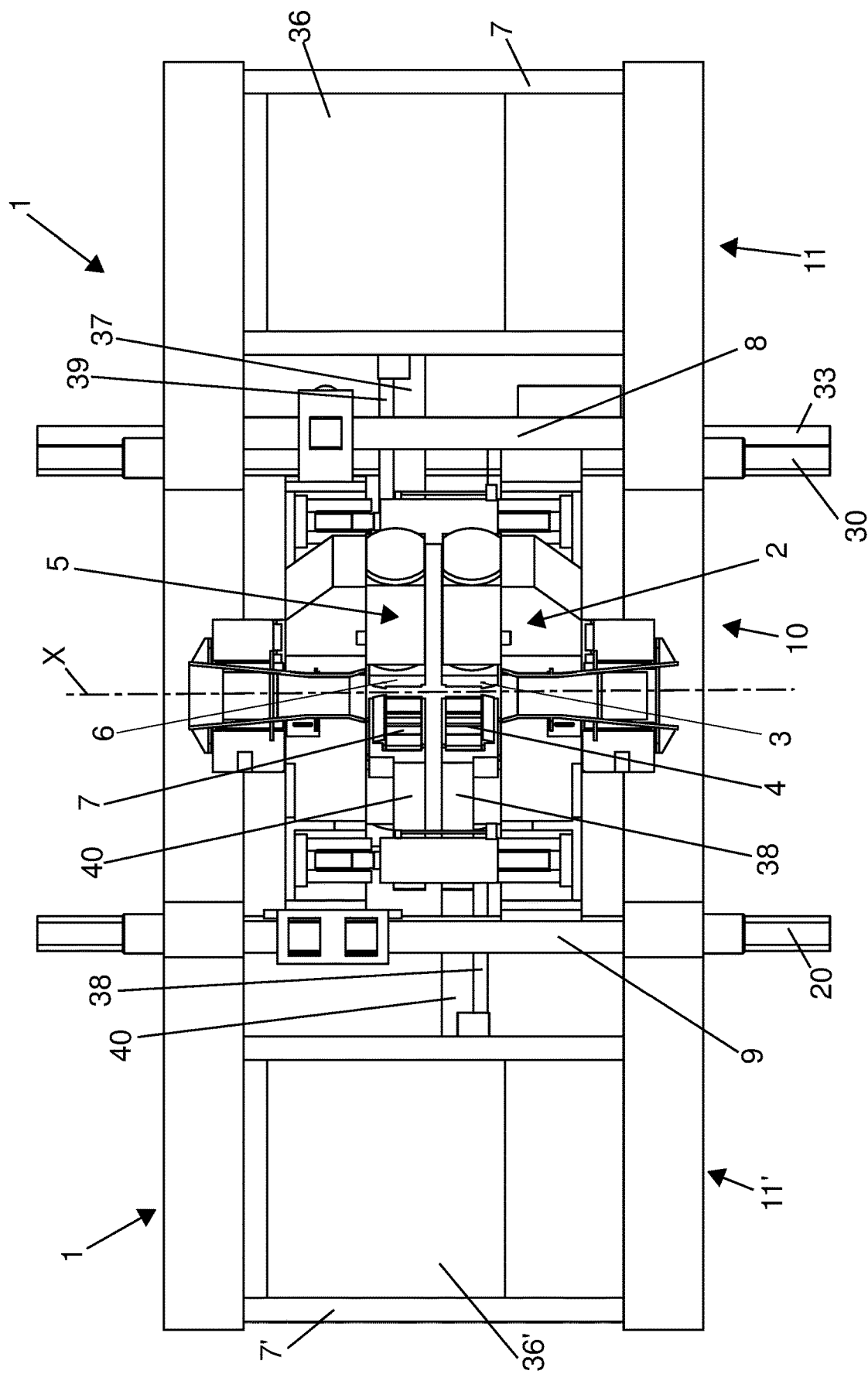
FIG. 7 is a perspective view of a second embodiment of the welding machine according to the invention.

A second embodiment of the welding machine of the invention is shown in FIG. 7. The description provided above for the first embodiment also applies to this second embodiment. The latter differs from the first embodiment in that it provides for:
a first transformer 36 fixed to the carriage 1 and supported, and possibly also contained, entirely in the second part 11 of the carriage 1, arranged laterally outside the first part 10 delimited by the first beam 9 and the second beam 8;
and a second transformer 36' fixed to the carriage 1 and supported, and possibly also contained, in a third part 11' of the carriage 1 arranged laterally outside the first part 10, in an opposite way to the second part 11.

The first part 10 of the carriage 1 is delimited by the first beam 9 and by the second beam 8 of the carriage 1, which are parallel to the feeding direction X.

The second part 11 of the carriage 1 is delimited by said second beam 8 and by a third beam 7 of the carriage 1, preferably parallel to the second beam 8.

The third part 11' of the carriage 1 is delimited by said first beam 9 and by a fourth beam 7', preferably parallel to the first beam 9.

The fourth beam 7' and the third beam 7 are peripheral beams of the carriage 1 while the first beam 9 and the second beam 8 are intermediate beams of the carriage.

At least two further peripheral beams, which are transverse, preferably perpendicular, to the beams 7', 9, 8, 7 are provided to define the perimeter of the carriage 1 together with the beams 7' and 7.

In this second embodiment, an upper conductor 37 and a lower conductor 39 exit the first transformer 36 and reach the upper clamps 3 and 6 of the structures 2 and 5, respectively; while an upper conductor 40 and a lower conductor 38 exit the second transformer 36' and reach the lower clamps 4 and 7 of the structures 2 and 5, respectively. Also in this case, the pattern of the currents is such that the two circuits close between the upper clamps 3 and 6 and between the lower clamps 4 and 7, respectively.

A third embodiment of the welding machine of the invention (not shown) differs from the aforementioned second embodiment in that it provides:
the first structure 2 defining a longitudinal axis Z inclined with respect to a horizontal plane, by an acute angle, preferably between 30° and 70°, e.g. 45°;
and the second structure 5 defining a longitudinal axis Z' thereof which is skew with respect to the longitudinal axis Z and inclined with respect to the aforesaid horizontal plane by an obtuse angle, preferably comprised between 120° and 160°, e.g. 135°.

The second structure 5 is arranged substantially parallel to the first structure 2 and spaced therefrom along the feeding direction X of the products to be welded.

The invention claimed is:

1. A welding machine, preferably of the flash welding type, to weld a tail of a first longitudinal metal product together with a head of a second longitudinal metal product along a feeding direction of said longitudinal metal products, the machine comprising a carriage adapted to slide along the feeding direction,
said carriage supporting
a first structure connected to said carriage;
first clamping means, provided on said first structure, to clamp either the tail of the first longitudinal metal product or the head of the second longitudinal metal product;
a second structure adapted to slide, with respect to both the first structure and the carriage, parallel to the feeding direction;
second clamping means, provided on said second structure, to clamp either the head of the second longitudinal metal product or the tail of the first longitudinal metal product;
at least one transformer provided with conductors connected to the first clamping means and to the second clamping means, respectively, to supply electric current to said tail and said head;
wherein the first structure and the second structure are supported in a first part of the carriage delimited by a first beam and a second beam of the carriage that are parallel to the feeding direction, while the at least one transformer is fixed to the carriage and supported in a second part of the carriage, arranged laterally outside the first part.

2. The machine according to claim 1, wherein only one transformer or two or more transformers completely supported in said second part of the carriage are provided; or wherein at least two transformers are provided, a first transformer of said at least two transformers being fixed to the carriage and supported in said second part of the carriage, and a second transformer of said at least two transformers being fixed to the carriage and supported in a third part of the carriage arranged laterally outside the first part, on a side opposite to the second part.

3. The machine according to claim 1, wherein said second part is delimited by said second beam and by a third beam of the carriage, preferably parallel to the feeding direction.

4. The machine according to claim 3, wherein, in the case of only one transformer or two transformers completely supported in the second part, the first beam and the third beam are peripheral beams of the carriage, while the second beam is an intermediate beam; or wherein, in the case of a first transformer supported in the second part and a second transformer supported in the third part of the carriage, said third part is delimited by said first beam and a fourth beam, the fourth beam and the third beam being peripheral beams of the carriage, while the first beam and the second beam are intermediate beams of the carriage.

5. The machine according to claim 1, wherein the conductors connect the at least one transformer to the first clamping means and to the second clamping means, respectively, passing underneath the first structure and the second structure, respectively, so as to have both a space between the first clamping means and a space between the second clamping means freely accessible from below in the absence of longitudinal metal products to be welded.

6. The machine according to claim 1, wherein both a space between the first clamping means and a space between the second clamping means are freely accessible both from above and below in absence of longitudinal metal products to be welded.

7. The machine according to claim 1, wherein the first structure and the second structure are arranged substantially parallel to each other and transversely, preferably orthogonally, to the first beam and the second beam.

8. The machine according to claim 7, in which the first structure and the second structure define a respective longitudinal axis inclined, with respect to a horizontal plane, by an acute angle between 30° and 70°; or wherein the first structure and the second structure define a respective longitudinal axis arranged substantially horizontally.

9. The machine according to claim 1, wherein the first structure and the second structure are supported in the first part of the carriage by means of a lifting system adapted to lift together said first structure and said second structure with respect to the carriage, by means of a rotation along a plane transverse to said feeding direction.

10. The machine according to claim 9, wherein said lifting system is of the linkage type;
preferably wherein said lifting system comprises
a first rotating shaft, parallel and proximal to the first beam of the carriage and constrained to the carriage so as to rotate about an axis thereof;
a second rotating shaft, parallel and proximal to the second beam of the carriage and constrained to the carriage so as to rotate about an axis thereof;
a further first beam, distinct from the carriage, parallel, proximal and possibly placed above said first rotating shaft and said first beam;
a further second beam, distinct from the carriage, parallel, proximal and possibly placed above said second rotating shaft and said second beam;
wherein the further first beam and the further second beam support both the first structure and the second structure, which are arranged substantially parallel to each other and transversely, preferably orthogonally, to said further first beam and said further second beam;
wherein the first rotating shaft is, directly or indirectly, connected to said further first beam by means of at least one first lever;
wherein the second rotating shaft is connected, directly or indirectly, to said further second beam by means of at least one second lever;
and wherein at least one actuator is provided, adapted to rotate the first rotating shaft and/or the second rotating shaft by a predetermined angle so that the first structure and second structure can be lifted together with respect to the carriage.

11. The machine according to claim 10, wherein said further first beam and said further second beam have a respective first portion, which is proximal to the first structure and to which said first structure is integrally fixed, and a respective second portion, which is distal from the first structure and to which the second structure is slidingly connected.

12. The machine according to claim 1, wherein the first structure and the second structure are supported in the first part of the carriage, preferably directly, by means of the first beam and the second beam of the carriage that have a respective first portion, which is proximal to the first structure and to which said first structure is integrally fixed, and a respective second portion, which is distal from the first structure and to which the second structure is slidingly connected.

13. The machine according to claim 11, wherein the second portion of the further first beam or of the first beam is inserted into a first through-hole of the second structure, internally provided with first rolls or pads for the second structure to slide on said further first beam or first beam; and wherein the second portion of the further second beam or second beam is inserted into a second through-hole of the second structure, internally provided with second rolls or pads for the second structure to slide on said further second beam or second beam.

14. The machine according to claim 13, wherein both the second portion of the further first beam, or of the first beam, and the first through-hole have a quadrangular section, and said first through-hole is provided with the first rolls or pads on two opposite inner sides only, preferably wherein a pair of first rolls is provided on each of said two inner sides; and wherein both the second portion of the further second beam, or the second beam, and the second through-hole have a quadrangular section, and said second through-hole is provided with at least a second roll or pad on at least three of the inner sides thereof;
or wherein both the second portion of the further first beam, or of the first beam, and the first through-hole have a round section, and said first through-hole is provided with the first pads; and wherein both the second portion of the further second beam, or of the second beam, and the second through-hole have a round section, and said second through-hole is provided with the second pads.

15. The machine according to claim 14, wherein the first rolls are idle, accommodated in respective seats obtained in the second structure and protruding into the first through-hole to come into contact with mutually opposite surfaces of the further first beam or of the first beam; and wherein the second rolls are idle, accommodated in respective seats obtained in the second structure and protruding into the second through-hole to come into contact with the respective side surface of the further second beam or of the second beam.

16. The machine according to claim 1, wherein the carriage is adapted to slide on at least two sliding guides along the feeding direction, and is provided with at least one motor connected to a toothed wheel adapted to be meshed with a rack provided on at least one of the sliding guides.

17. The machine according to claim 1, wherein adjustment means are provided for moving the second structure towards or away from the first structure along said feeding direction.

18. The machine according to claim 1, wherein both the first clamping means and the second clamping means are positionally adjustable by means of respective moving systems provided on the first structure and on the second structure, respectively.

19. The machine according to claim 1, wherein all components of the machine subject to maintenance are accessible and can be lifted from above.

* * * * *